United States Patent [19]

Stich

[11] 4,301,489
[45] Nov. 17, 1981

[54] ARCLESS TAP CHANGER UTILIZING STATIC SWITCHING

[75] Inventor: Frederick A. Stich, Milwaukee, Wis.

[73] Assignee: Siemens-Allis, Inc., Atlanta, Ga.

[21] Appl. No.: 105,082

[22] Filed: Dec. 19, 1979

[51] Int. Cl.³ .............................................. H02H 7/22
[52] U.S. Cl. ............................................. 361/9; 361/13; 361/8; 307/134; 307/137
[58] Field of Search ............... 361/8, 13, 9, 3, 5, 361/6; 323/43.5 R, 43.5 S; 307/134, 135, 137

[56] References Cited

U.S. PATENT DOCUMENTS

| | | | |
|---|---|---|---|
| 3,515,980 | 6/1970 | Throop | 323/43.5 S |
| 3,621,374 | 11/1971 | Kettler | 323/43.5 S |
| 3,621,375 | 11/1971 | Kettler | 323/43.5 S |
| 3,786,337 | 1/1974 | Kugler | 361/8 X |
| 4,130,789 | 12/1978 | Neumann | 323/43.5 R |
| 4,201,938 | 5/1980 | Neumann | 323/43.5 R |

*Primary Examiner*—Patrick R. Salce
*Attorney, Agent, or Firm*—Frederick W. Powers, III

[57] ABSTRACT

A tap changer voltage regulator permits a tap changer switch selector contact to engage an open-circuited new tap without arcing and has a half-tap voltage auxiliary winding which permits halving the inter-tap voltage and doubling the number of steps, and also has an auxiliary switch system. An auxiliary static switch circuit initially connects a first tap selector in series with a circulating current limiting resistor and a load to prevent load circuit interruption. An auxiliary selector switch initially coupled to a second tap selector and is in series with a normally-closed switch through which the load current and circulative current flow. The normally-closed switch is shunted by a second static switch circuit. The first static switch is not gated until the first tap selector has attained its new position, precluding initial arcing. The normally-closed switch is then opened; subsequently gating current is removed from the second static switch so that load and circulating current are statically interrupted at current zero. The selector may then be arclessly disconnected from the second tap selector and moved to contact the first tap selector.

4 Claims, 7 Drawing Figures

4,301,489

ARCLESS TAP CHANGER UTILIZING STATIC SWITCHING

BACKGROUND OF THE INVENTION

This invention relates to voltage control systems of the tap changing type, and more particularly to an improved circuit for preventing arcing as taps are changed.

A step voltage regulator is an autotransformer provided with load ratio control equipment for regulating the voltage on the feeder or bus to which it is connected. A typical step voltage regulator may have a 100 percent exciting winding in shunt with the line on the source side and normally maintains the voltage on the load side within a desired voltage bandwidth by a 10 percent tapped buck/boost winding in series with the line. The series winding has taps connected to the stationary contacts of a tap changer dial switch having a pair of rotatable tap selectors driven by a reversible motor into sequential engagement with the taps and usually provides the ability to change the effective turns ratio from input to output plus or minus 10 percent in 32 steps of ⅝ percent voltage increments. The rotatable selectors are usually connected through collector rings to the opposite sides of a bridging center-tapped autotransformer reactor, termed a preventive autotransformer, to permit transition from one tap position to another without interrupting the load current. When the tap selectors bridge adjacent taps, the high reactance of the preventive autotransformer limits circulating current to a safe value and reduces burning and erosion of the tap changer contacts. It also provides a voltage midway between that of the physical taps to thereby provide twice the number of voltage steps. However, such a preventive autotransformer has continuous energy losses in operation and is bulky and expensive to construct, and U.S. Pat. No. 4,130,789, incorporated herein by reference, discloses a tap changing voltage regulator which eliminates such preventive autotransformer and also prevents arcing at the tap changer selector contacts by providing a half-tap voltage auxiliary winding and an auxiliary switch which permits a selector contact to step arclessly to an open circuited new tap, and then connects the selector contact in series with the auxiliary winding and a current-limiting inductor and the load at reduced voltage to effect a tap change without interruption of the load circuit. U.S. patent application Ser. No. 947,871, filed Oct. 2, 1978, and also incorporated herein by reference, teaches a voltage regulation system which allows for substantially arcless tap changing without utilizing a preventive autotransformer. While the inventions set forth in the foregoing patent and patent application provide greatly improved results over previously known voltage regulators, it has been found that some arcing still occurs under operating conditions.

It is therefore an object of this invention to provide an improved tap changer voltage regulator which eliminates arcing at the auxiliary contacts thereof and also arclessly interrupts the current which circulates when the selector contacts are on adjacent taps during a tap change.

Another object of the invention is to provide an economical and simplified circuit for an arcless tap changer which provides an acceptably small step change in voltage.

BRIEF DESCRIPTION OF THE DRAWINGS

While the specification concludes with claims particularly pointing out and destinctly claiming the subject matter which is regarded as the invention, it is believed that the invention will be better understood from the following description of a preferred embodiment taken in conjunction with the accompanying drawings in which:

SUMMARY OF THE INVENTION

A tap changer voltage regulator permits a tap selector to engage an open-circuited new tap in either direction without arcing and has an auxiliary switch system with a movable contact which couples the tap selector on the new tap through a main current switch, or alternatively a pair of thyristors, to an outgoing load-current-carrying line. The thyristors are gated on only after the new tap is contacted to prevent arcing.

In addition to being capable of being coupled to the movable auxiliary contact, a first of the tap selectors is coupled through a current limiting resistor and second pair of thyristors to the load-current-carrying line. When the first tap selector is moved to a new tap position, the second pair of thyristors is gated on and thereby provides a second, parallel load current circuit. With this circuit established, the first pair of thyristors is gated on and the main current switch arclessly opened. Thereafter the first pair of thyristors is gated off and the movable auxiliary switch, being open-circuited, can be arclessly transferred to engage the first tap selector. Thereafter the first pair of thyristors is again gated on and the main current switch is closed, whereby a voltage increase is established. This main current path is once more available, the second pair of thyristors is gated off.

When it is decided to reestablish load current through the second tap selector, for instance after the latter has been moved to a new tap, the foregoing process is reversed. The temporary shunt circuit is reestablished by gating on the second pair of thyristors, after which the main current switch may be opened, with the main current-carrying path broken, the movable selector can arclessly make contact with the newly-moved tap selector. Thereafter the main current switch is closed, and the thyristors in the shunt path are gated off.

DETAILED DESCRIPTION OF THE INVENTION

Figure 1:
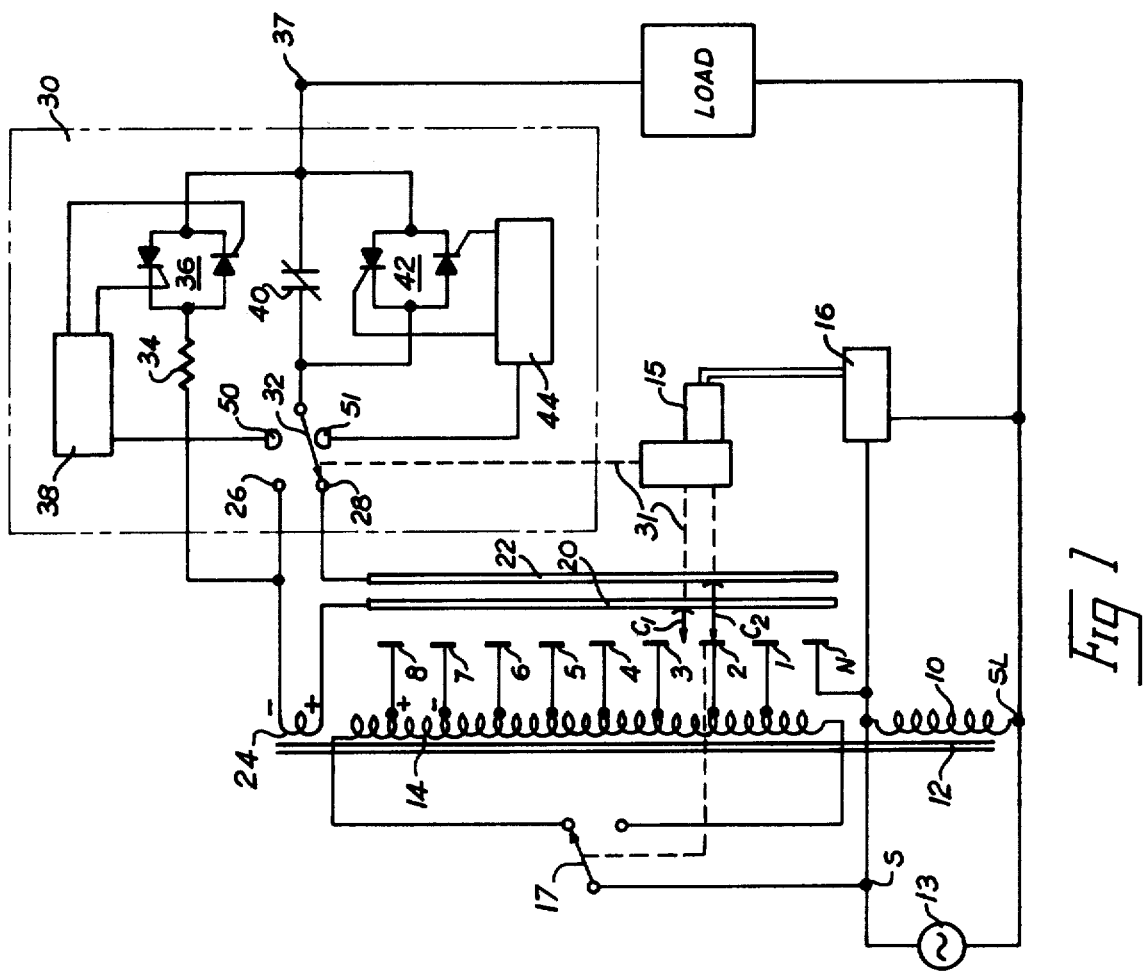
FIG. 1 is a schematic circuit diagram of a preferred embodiment of the invention in quiescent state.

A step voltage regulator embodying the invention illustrated in FIG. 1 has a 100 percent exciting winding 10 which inductively links a magnetic core 12 and is connected across the regulator S and SL bushings which are adapted to be connected to an alternating current source 13, such as a power line to be regulated. The regulator also has a 10 percent series winding 14 which inductively links magnetic core 12 and is connected in series with the power line and is provided with a plurality of taps 1–8 of a tap changer dial switch, which contacts are preferably arranged in a circle and driven to the desired position by motor 15 and conventional motor control 16.

One side of winding 10 is connected to a stationary neutral tap N and is also connected to the one end of series winding 14 by an automatic, mechanically operated reversing switch 17 which reverses the polarity of series winding 14 so that it may be connected in bucking or boosting relation with shunt winding 10, thereby doubling the range of the tap changer system. Two movable tap selectors C1 and C2 are provided. The tap selectors are preferably rotatable and sequentially engage the stationary taps 1–8 and N. Tap selector C2 is in engagement with a tap in the quiescent state of the tap changer switch in FIG. 1, and tap selectors C1 and C2 are in bridging relation with adjacent stationary contacts or on the same stationary contacts only during a tap change. Tap selectors C1 and C2 slidably engage collectors 20 and 22 respectively which are conventionally slip rings in concentric relation with the circle of stationary taps 1–8 and N.

A half-tap voltage auxiliary winding 24 inductively linking magnetic core 12 has approximately one-half as many turns as the number of turns between adjacent taps of series winding 14 so that auxiliary winding 24 derives a full-step (half-tap) voltage. Preferably auxiliary winding 24 is wound to oppose the voltage of series winding 14, but an alternative embodiments auxiliary winding 24 may be in aiding relation to winding 14. One end of auxiliary winding 24 is connected to collector 20, and the other end is connected to contact 26 and to the shunt circuit of an auxiliary switching system generally designated 30 and bounded by a broken line. A first stationary contact 28 is connected to collector 22. The auxiliary switch system is preferably operated synchronously with tap changer switch selector contacts C1 and C2 by a common drive mechanism schematically represented at 31.

Auxiliary system 30 includes selector switch 32 which engages either of stationary contacts 26 and 28. As is conventional in tap changer mechanisms of the general type illustrated, a cam-and-follower drive mechanism or alternatively a scotch yoke drive is coupled to selector switch 32 which causes it to operate in the proper sequence relative to tap selector C1 and C2. Stationary contact 26 is connected through a resistor 34, a first static circuit comprised of a pair of inverse parallel SCR's 36 and output terminal 37 to a load. A first gating control 38 supplies gating current to SCR's 36 as selector switch 32 approaches contact 26, as sensed by a transducer such as first microswitch 50.

Selector switch 32 is connected to the load through a normally closed main current switch 40 operated in a conventional manner by the drive mechanism. A second pair of SCR's 42 connected in inverse parallel are connected in shunt about switch 40 so that load current flows through the selector C2, through selector switch 32 and either through contactor 40 or SCR's 42. A second gating circuit 44 regulates the gating of SCR's 42 and receives inputs from second microswitch 51.

Gating circuits 38 and 44 may be of any appropriate type, it being recognized by those skilled in the art that a broad range of thyristor gating circuits are available in standard reference books. For example, the "SCR manual," Fifth Edition, published by the General Electric Company, teaches a number of such circuits. Further, the above-referenced U.S. Pat. No. 4,139,789 and co-pending U.S. patent application Ser. No. 947,871, which are incorporated herein by reference, teach additional, specific gating circuits. It will be recognized that gating circuits 38 and 44 may be energized in response to signals from current transformers, voltages derived from various circuit conductors, or by mechanical transducers such as microswitches. Election of appropriate sensing means is not considered germane to the present invention and will vary in accordance with the application of a given design and the preference of circuit.

Figure 2:
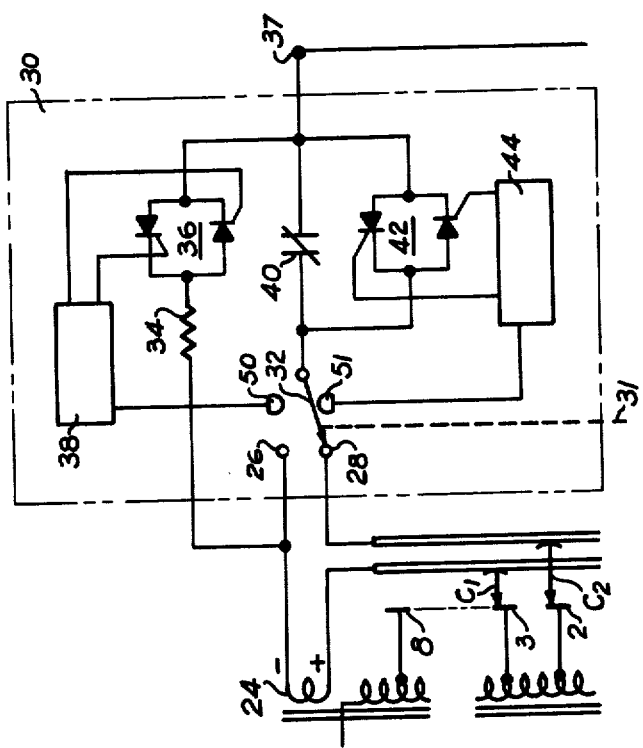

FIGS. 2 through 5 illustrate successive conditions of the elements of the circuit during tap changes. In FIG. 2 selector C2 is on tap 2, selector C1 is now on tap 3 and selector switch 32 is still engages stationary contact 28.

The linkage 31 which advances selector C1 to its new position closes microswitch 50 operating gating control 38 by means of mechanical link, or by the movement of switch 32. In practice, a microswitch or the like may simply be located adjacent the cam and lever system used to move selector C1. Gating current is then applied to the gates of SCR's 36 so that the latter will be rendered conductive in the presence of a forward-biasing voltage. Since selector C1 is in contact with tap 3, the alternating voltage derived there, as increased by winding 24, produces current flow through SCR's 36. This current flows to the system load and also circulates through main current switch 40, selector switch 32 and tap selector C2. The magnitude of the circulating current is limited by resistor 34.

Figure 3:
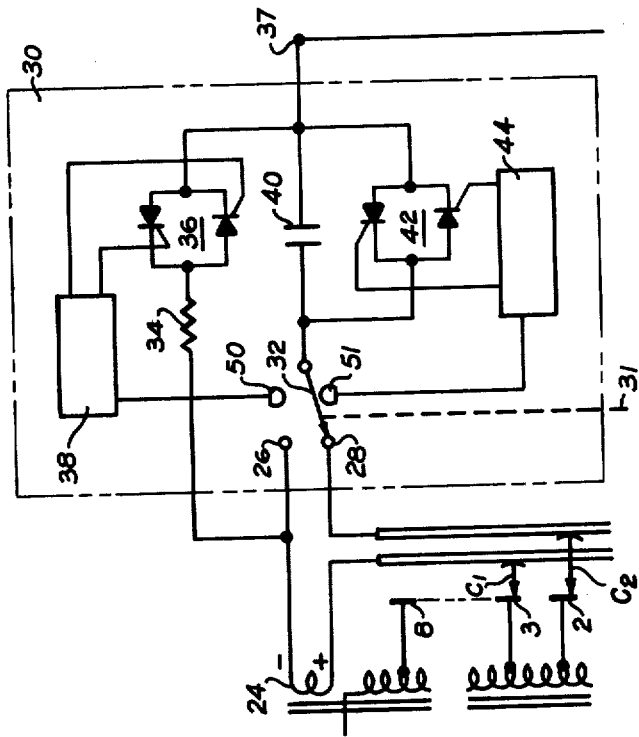
FIGS. 2 through 7 show the apparatus of FIG. 1 in sequential states of operation.

The next step in the operation of the apparatus is illustrated in FIG. 3, wherein main current switch 40 is opened. SCR's 42 are enabled by control 44 and shunt current about switch 40 so that no arcing occurs. The motion of the drive mechanism which moves selector switch 32 is sensed by microswitch 51 and in response thereto control 44 cuts off the gating signal to SCR's 42. Thereafter current flow through the SCR's passes through zero, and the SCR's are cut off. At this point all load current is being drawn through tap selector C1, current limit resistor 34, and SCR's 38. No current is flowing through selector switch 32.

Figure 4:
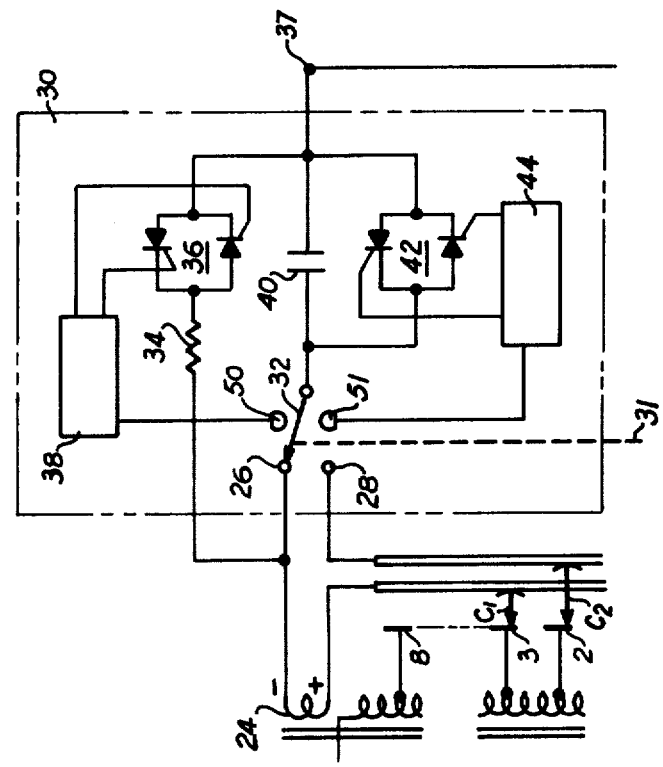

As shown in FIG. 4, switch 32 then engages stationary contact 26. Disengagement from stationary contact 28 is arcless, as there is no current flow through the switch. Further, due to the open state of switch 40 and the nonconductive state of SCR's 42, there is no tendency for switch 32 to arc as it approaches stationary contact 26.

Figure 5:
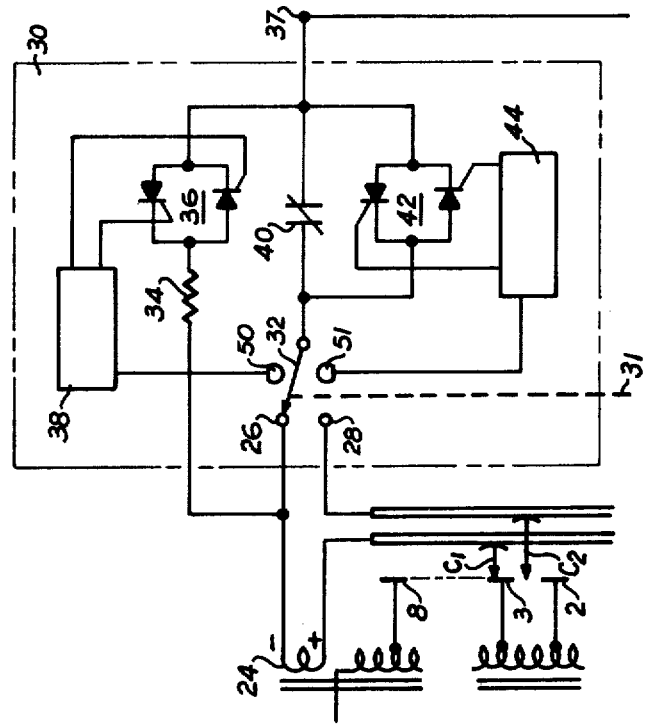

As shown in FIG. 5, switch 40 is thereafter closed whereupon current flows from tap 3 and through winding 24, stationary contact 26, switch 32 and main current switch 40. Selector switch 32 and main current switch 40 effectively shortcircuit the upper circuit including SCR's 36 and current limiting resistor 34. As switch 32 engages terminal 26, microswitch 50 causes control 38 to cut off gating signals to SCR's 36. Tap selector C2 may now be arclessly disengaged from tap 2 as shown, or may be left on the latter.

Figure 7:
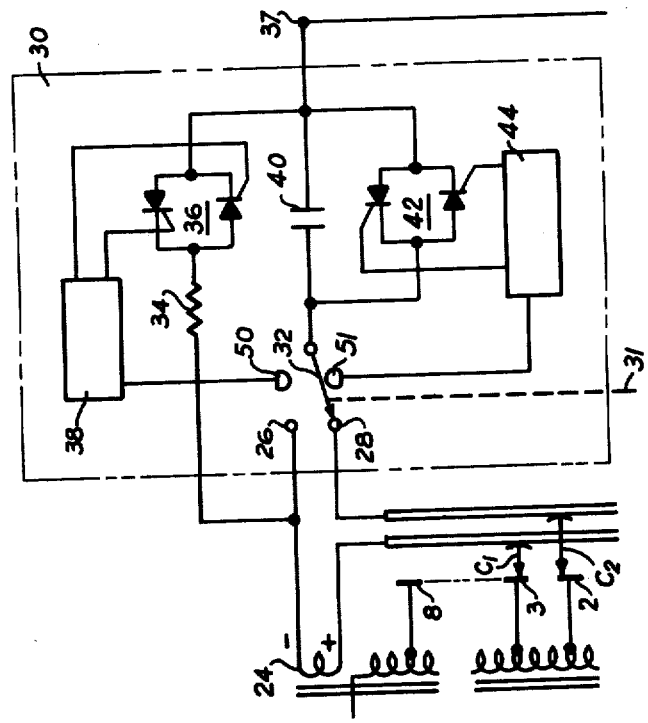
Figure 6:
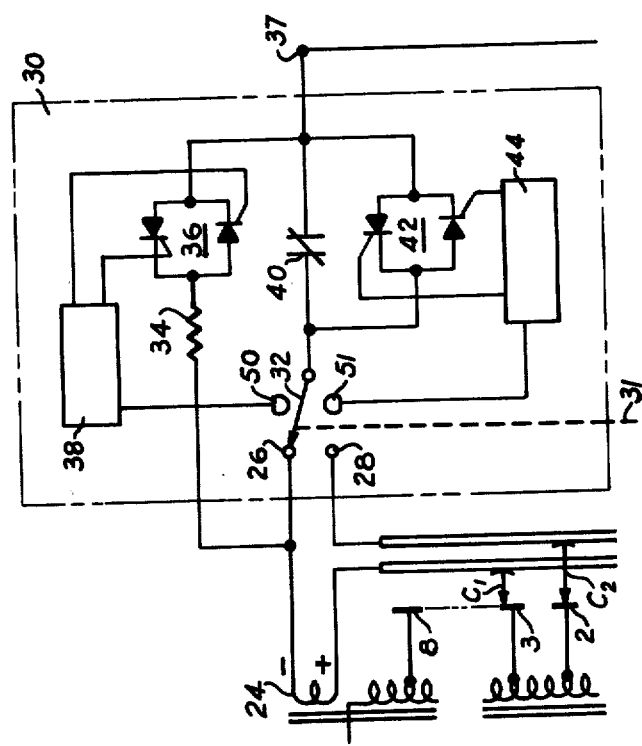

Consider now the case in which a lowering, rather than a raising, of voltage is sought. As shown in FIG. 6, selector C2 is brought into contact with (or may already be in contact with) the next tap below that engaged by selector C1, in this instance tap 2. Movement by mechanism 31 once again trips the microswitch or other transducer associated with gating control 38. As set forth above, the control thereupon applies gating current to gate of SCR's 36, rendering them conductive. The drive mechanism which moves switch 32 trips microswitch 32, causing SCR's 42 to conduct momentarily after which switch 40 may open arclessly. As shown in FIG. 7 switch 32 may now be disengaged from stationary contact 26 by the operating mechanism 31 and brought into engagement with stationary contact 28. No arcing occurs when switch 32 disengages contact 26, inasmuch switch 40 and SCR's 42 are nonconducting. After switch 32 has disengaged contact 28, and preferably after a short time delay to allow contact bounce to cease, main current switch 40 is closed. Initially some circulating current will flow between taps 3 and 2, but the presence of resistor 34 serves to keep the level of current flow to an exceptable level.

After switch 32 has been transferred to a new stationary contact microswitch 50 disables gating control 38, whereby gating current is removed from the gate of SCR's 36. The latter then cease to conduct as the current flow through them passes through zero. The current shunt path is now inactivated, and all load current flows through the newly-engaged tap 2 through selector switch 32 and main current switch 40.

It will now be recognized that there has been disclosed an improved arcless tap changer circuit which is extremely simple, and economical in design. Although it will be noted that the discontinuities or "step" voltages encounted in "lower" tap changes are greater than those in the "raise" mode, it has been determined that the voltage step thus produced is well within the requirements of electric utilities. Further, it will be evident from the foregoing description that certain aspects of the invention are not limited to the particular details of the example illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A tap change voltage regulator including a tapped electrical winding having a plurality of taps, a part-tap voltage auxiliary winding inductively linked to said tapped winding, a pair of tap selectors adapted to sequentially engage said taps, one of said tap selectors being coupled to one side of said auxiliary winding, an auxiliary switch having first and second stationary contacts coupled respectively to the other side of said auxiliary winding and to the second of said tap selectors; an output terminal; a main current switch coupled between said auxiliary switch and said output terminal; first static switching means connected in shunt about said main current switch; first control means for said static switching means; and drive means for sequentially operating said tap selectors and said auxiliary switch, the improvement comprising a tap changing shunt circuit coupled between said other side of said auxiliary winding and said output terminal thereby to provide an alternate current path about said auxiliary switch and said main current switch, said auxiliary shunt circuit comprising the series combination of a second static switching means and a current limiting resistor; and second control means coupled to said second static switching means for enabling said second static switching means to provide a conductive path around said auxiliary switch and said main current switch whereby current flow through said main current circuit can be arclessly interrupted.

2. In a tap changing voltage regulator having an input terminal adapted to be coupled to a source of electric power and having an output terminal adapted to be coupled to a load, and including a first, main winding and a second, tapped winding; a pair of movable tap selectors, drive means for operating said tap selectors, a pair of collectors coupled to the tap selectors, and an auxiliary circuit to enable the arcless connection and disconnection of said tap selectors with one of the taps the improvement comprising a first terminal coupled to a first collector; an auxiliary winding electromagnetically linked to said tapped winding; a second terminal; said auxiliary winding being coupled between the second collector and said second terminal; a shunt circuit comprising the series combination of a current limiting resistor and first thyristor switch means coupled between said second terminal and said output terminal; a selector switch for selectively engaging one of said first or said second terminals; current switch means coupling said selector switch and said output terminal; second thyristor switch means coupled in shunt with said current switch means; and control means for enabling said first thyristor switch before said selector switch is transferred from one terminal to the other, and for subsequently disabling said first thyristor switch and then enabling said second thyristor switch subsequent to the engagement of said other terminal by said selector switch.

3. The improvement defined claim 2, wherein said current switch is a normally-closed electromechanical switch.

4. The improvement defined in claim 2, further including first and a second transducers coupled in motion sensing relation to said selector switch, said transducers being connected to said control means.

* * * * *